United States Patent Office

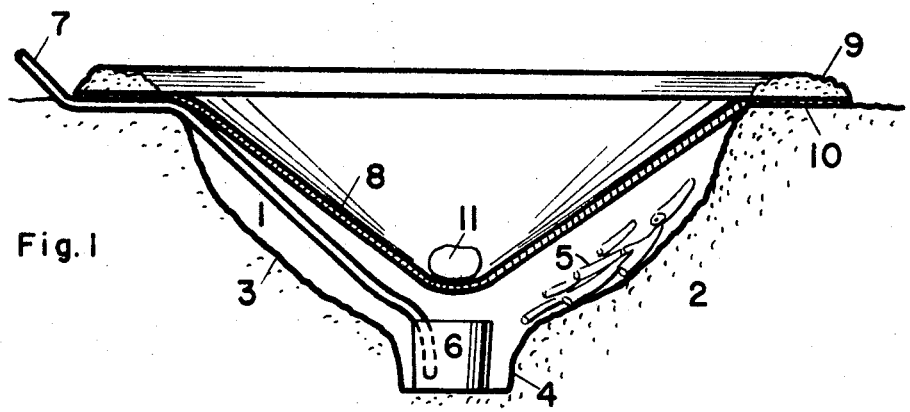
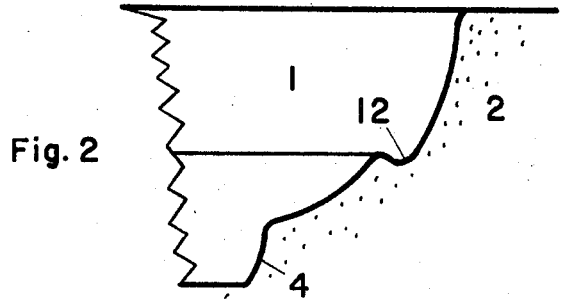
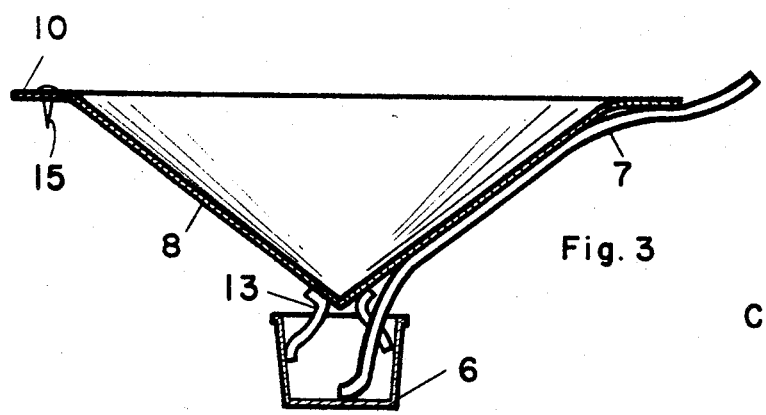

3,436,313
Patented Apr. 1, 1969

3,436,313
SURVIVAL STILL FOR OBTAINING POTABLE WATER
Cornelius H. M. van Bavel and Ray D. Jackson, Tempe, Ariz., assignors to the United States of America as represented by the Secretary of Agriculture
Filed Oct. 21, 1965, Ser. No. 500,438
Int. Cl. B01d 3/00
U.S. Cl. 202—83                                              1 Claim

ABSTRACT OF THE DISCLOSURE

Survival device for use for travelers in arid regions, which enables one to obtain potable water from soil, plant materials, contaminated water, etc. A pit is dug in the soil and preferably lined with plant material. A sheet of clear plastic is disposed in the pit, forming a cone with its apex down. A receptacle is placed at the base of the pit under the the apex. Sunlight passing through the sheet vaporizes moisture in the soil or plant material, this moisture condensing on the sloping surface of the conical sheet and flowing to the apex thereof, from which it drops into the receptacle. A hose may be provided so that water may be sucked out of the receptacle without disturbing the arrangement.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel apparatus for supplying water for emergency use as, for example, where a person is stranded in a desert area without drinking water.

In particular, the invention concerns a still which utilizes solar energy for distilling water from available, but not potable, soures such as soil, plant material, contaminated water, mud, or other moisture-containing material. Special advantages of the apparatus are that it is simple in construction, requires but inexpensive materials for its fabrication, and needs no source of fuel or energy other than ubiquitous sunlight. Moreover, the essential components of the device of the invention can be rolled or folded into a small package. As a result, persons who are likely to travel in desert or similar arid regions can conveniently stow the equipment in pack or pocket.

The apparatus of the invention is illustrated in the annexed drawing wherein FIGS. 1, 2, and 3 depict, in cross-section, three modifications of the invention. In these figures, some of the parts such as conical sheet 8 are shown in exaggerated thickness for clarity of representation. In the several figures, like numerals indicate like parts.

The construction and operation of the still of the invention are explained below, having reference particularly to FIG. 1.

In constructing the still, a pit 1 is dug into soil 2. This pit is formed with generally hemispherical sides 3 and central depression 4.

Although the soil itself can be used as the source of moisture, it is preferred, especially in desert areas, to supply plant material as an added moisture source. Thus cactus plants or other available vegetation may be cut into pieces 5 and the sides of pit 1 lined therewith. (In the drawing only a representative sample of the plant material is depicted; in practice the total circumference of the pit would be lined with the vegetative material.)

A bucket 6 is placed in central depression 4 and a rubber or plastic hose 7 is placed with one end in the bucket and the other end extending beyond the periphery of the pit. For best results, the lower end of hose 7 should be taped or otherwise fastened to bucket 6 to prevent displacement.

A transparent plastic sheet 8 is placed over pit 1 and anchored in place with a ring 9 of soil on the skirt 10 of sheet 8. The sheet is then pushed down in the middle so that it assumes a conical shape, the sides of which subtend an angle of about 100–130°. To maintain this conical configuration, a rock 11 (or other available heavy object) is placed at the apex of the cone.

In positioning sheet 8, care should be taken that it hangs free in the pit, i.e., that its sloping surface does not contact the soil nor the vegetable material in the pit. If there is such contact the water collected in the device may pick up flavor or other undesirable components from the moisture source which touches the sheet. Also, after sheet 8 has been arranged in the conical shape, some adjustment of ring 9 may be required to ensure that the entire circumference of skirt 10 is pressed against the soil surface. This is required to effectively seal the sheet about the edges of the pit, whereby to prevent escape of water vapor from the pit into the atmosphere. In the event that the skirt is not properly sealed, the yield of water eventually obtained will be reduced because of leakage of water vapor.

After setting up the system, it is simply allowed to stand exposed to the sky. Sunlight passes through plastic sheet 8 and is absorbed by soil 2 and plant material 5, resulting in evaporation of moisture therefrom. The resulting moisture vapor condenses on the relatively cooler surface of sheet 8. This liquid water which forms on the underside of the sheet runs to the apex of the cone and drops into bucket 6. After a quantity of water has been obtained, it can be sucked up through hose 7 without disturbing the system. It is obvious that if a hose is not available, sheet 8 can be lifted up and bucket 6 removed from the pit for obtaining the water. This system is, however, not preferred because if sheet 8 is lifted, it will take from ½ to 1 hour for the air (between the sheet and the pit) to become resaturated and for collection of water to begin again. Where the hose is used, there is no such disruption and the collection of water is continuous.

The size of the system can obviously be varied. A convenient size which can be set up in 15–30 minutes utilizes a pit about 40 inches in diameter and about 20 inches deep. About 1 to 2 hours are required for the air between the sheet and pit walls to become saturated and condensate to start dripping onto the receiver.

Typical installations of the above sive constructed in moist clay soil will yield about 3 pints of water per day. Stills constructed in much drier soil such as that usually found in the desert will yield about 0.5 pint per day. However, if the pit is lined with pieces of fleshly plant such as cactus, it will yield about 3 pints per day. The following data illustrates the effect of using soil alone and in conjunction with various kinds of plants. The test stills were constructed in a desert area near Phoenix, Ariz. where the moisture content of the soil was 3%. In the stills, sheet 8 was polyvinyl fluoride film, 0.001″ thick.

| Plant used: | Water collected in 24-hr. period, ml. |
|---|---|
| None | 330 |
| Creosote bush | 370 |
| Cholla cactus | 650 |
| Saguaro cactus | 1570 |
| Barrel cactus | 1955 |
| Prickly pear cactus | 2165 |

It was also observed that the stills with added saguaro, barrel, and prickly pear cactus provided an average yield of about 1.5 liters per day for 5 days. The decrease in yield then taking place could be remedied by replacing the spent material with freshly cut cactus.

FIGURE 2 illustrates a modification of the invention for use with supplemental moisture sources in the liquid or semi-liquid state. In this system the construction and operation are as in the embodiment of FIG. 1 except that pit 1 is provided with an annular trough 12. In use, the moisture source is placed in this trough whereby water therefrom permeates into the soil about the pit walls and thus becomes available for production of potable water by the evaporation and condensation mechanism explained above. Typically, the supplemental water source used with this embodiment may be mud; salt, brackish, or alkaline water; polluted water; body wastes; etc. It is obvious that the modification of FIG. 1 need not be used solely with a liquid or semi-liquid source material; solid source material such as vegetation can be placed about the sides of pit 1 as previously described.

FIGURE 3 illustrates a preassembled kit for setting up a still in accordance with the invention. With this kit all the stranded person has to do is prepare a pit, drop the kit into place, secure it, seal the skirt with available sand or soil, and draw out water as it collects in the receiver. The kit includes a conical sheet 8 of transparent plastic material. Bucket 6 is affixed beneath the apex of the cone by tapes 13 (three or four in number) cemented at their upper ends to sheet 8 and at their lower ends to bucket 6. Hose 7 is affixed by cementing, taping, or the like to both bucket 6 and to the outer surface of sheet 8 so it will not become displaced in use.

In use, the weight of bucket 6 holds sheet 8 in a conical shape. However, if additional weight may be needed, this can easily be provided by placing a rock or a handful of sand in the apex of the cone.

For convenience in anchoring the apparatus, a series of spikes 15 may be provided about skirt 10 with their heads cemented or taped thereto. (For simplifying the drawing, only a single spike is shown; in practice they would be spaced uniformly about the skirt.)

In the modification of FIG. 3, the relative size of bucket 6 is preferably so selected this bucket can serve as the container for the kit itself. Thus for carrying the kit, the sheet and hose assembly can be rolled on a vertical axis, then folded into the bucket. If spikes 10 are provided, it would be preferable that these be covered with removable sleeves of cardboard or the like to avoid piercing or tearing the other components.

The plastic sheet (8 in FIGS. 1 and 3) should obviously be clear (that is, transparent or at least translucent) to permit passage of sunlight and strong enough to withstand use without tearing. A critical point is that the bottom or outer surface (that on which moisture condenses) should be wettable. Where the sheet has this property, the water drops which form will cling to the sheet as they run down to container 6. If, on the other hand, the surface is nonwettable many of the drops will fall off the sheet before reaching the container and the yield will be decreased. Plastic sheets having wettable surfaces are obtainable in commerce. In the event that none is at hand, the available material can be made more wettable by rubbing with fine sandpaper or other finely-divided abrasive or by scrubbing with a household scouring powder. A preferred type of plastic for the purpose of the invention is polyvinyl fluoride film, for example, the product commercially available under the name "Tedlar." Polyvinyl fluoride films are not only clear, strong, and wettable, but also have outstanding weatherability and resistance to chemical and thermal degradation. Generally, films of 0.001" thickness are used but this is not a critical matter.

In situations where the soil is utilized as the primary or only source of water, the still should be set up with special regard to the site. For example, such sites as stream beds or depressions where rainwater collects will generally contain more moisture than sites elevated above the surrounding terrain. In coastal areas, the still may be set up on a beach above the high-water mark. After a few days the salt accumulation on the soil surface may reduce yields. In this event a new pit could be dug a few feet away. In inland areas where there are ponds or other bodies of brakish or polluted water, the same principles may be applied. If a site near a body of water is not available, the pit can be on higher ground and the trough system utilized as described above in connection with FIG. 2.

Having thus described our invention, we claim:

1. A kit for constructing a survival still for obtaining potable water by solar energy from a nonpotable source of water, which comprises:
   (a) a cone of clear plastic sheet material having a wettable outer surface, said cone having an apex and a skirt;
   (b) a vessel attached to said cone beneath the apex thereof;
   (c) a hose extending from the inside of said vessel to a point beyond the skirt of said cone, said hose being attached to both the said vessel and the outer surface of said cone; and
   (d) wherein the said vessel is of such size relative to the remainder of the device that it serves as a container within which the said remainder may be stored when the kit is not in use.

References Cited

UNITED STATES PATENTS

| | | | |
|---|---|---|---|
| 2,118,459 | 5/1938 | Chappell et al. | 73—151 |
| 2,398,291 | 4/1946 | Delano | 202—234 |
| 2,412,466 | 12/1946 | Miller | 202—234 |
| 3,174,915 | 3/1965 | Edlin | 202—234 |
| 3,290,230 | 12/1966 | Kobayashi | 202—234 |
| 3,336,206 | 8/1967 | Sasaki et al. | 202—234 |
| 3,337,418 | 8/1967 | Halacy | 202—83 |

FOREIGN PATENTS

| | | |
|---|---|---|
| 386,077 | 1963 | Japan. |

NORMAN YUDKOFF, *Primary Examiner.*

D. EDWARDS, *Assistant Examiner.*

U.S. Cl. X.R.

202—190, 234